United States Patent [19]
Merving

[11] Patent Number: 5,873,190
[45] Date of Patent: Feb. 23, 1999

[54] PRISMATIC, PYRAMIDAL OR SIMILAR CHEMICAL CONTAINER FOR DISTRIBUTION OF CHEMICAL AGENT

[76] Inventor: Hans A. K. Merving, August Stalbergsvag 10A, 644 00 Torshälla, Sweden

[21] Appl. No.: 835,620

[22] Filed: Apr. 9, 1997

[51] Int. Cl.⁶ ................................................. A01G 29/00
[52] U.S. Cl. ................................................. 47/1.7; 47/48.5
[58] Field of Search ........................................ 47/1.7, 48.5

[56] References Cited

U.S. PATENT DOCUMENTS

| | | | |
|---|---|---|---|
| 718,380 | 1/1903 | Patterson | 47/1.7 |
| 1,948,117 | 6/1934 | Kadow | 47/1.7 |
| 3,232,007 | 2/1966 | Boatwright | 47/1.7 |
| 3,319,379 | 5/1967 | Groeber et al. | 47/1.7 |
| 3,691,683 | 9/1972 | Sterzik | 47/57.5 |
| 3,821,863 | 7/1974 | Chan | 47/1.7 |
| 3,864,874 | 2/1975 | Norris et al. | 47/57.5 |
| 3,968,594 | 7/1976 | Kawakami | 47/57.5 |
| 4,063,919 | 12/1977 | Grano, Jr. | 47/1.7 |
| 4,090,326 | 5/1978 | Crowson et al. | 47/57.5 |
| 4,344,250 | 8/1982 | Fahlstrom | 47/1.7 |
| 4,905,410 | 3/1990 | Merving | 47/57.5 |
| 5,010,684 | 4/1991 | Merving | 47/57.5 |
| 5,086,584 | 2/1992 | Merving | 47/57.5 |
| 5,207,021 | 5/1993 | Merving | 47/57.5 |
| 5,287,992 | 2/1994 | Merving | 221/270 |
| 5,341,594 | 8/1994 | Merving . | |
| 5,408,781 | 4/1995 | Merving | 47/57.5 |
| 5,425,201 | 6/1995 | Merving . | |
| 5,459,961 | 10/1995 | Merving . | |
| 5,471,784 | 12/1995 | Merving . | |
| 5,485,698 | 1/1996 | Merving . | |
| 5,505,021 | 4/1996 | Merving . | |

*Primary Examiner*—Kurt Rowan
*Assistant Examiner*—Fredrick T. French, III
*Attorney, Agent, or Firm*—Evenson, McKeown, Edwards & Lenahan, PLLC

[57] ABSTRACT

A prismatic container is used for insertion into a notch in an element in order to release a chemical agent from a container volume into the element. The container includes a plurality of first sides inclined outwardly relative to each other from at least one junction. These first sides form lateral sides of the container. A pair of second sides, parallel to each other, form longitudinal ends of the container. At least one of the first and second sides forms at least part of a cap for closing off an opening which provides access to the container volume for storage of the chemical agent. The second sides are formed of a biodegradable material which dissolves in order to release the chemical agent. Pyramidal and conical container configurations can also be utilized.

22 Claims, 4 Drawing Sheets

PRISMATIC, PYRAMIDAL OR SIMILAR CHEMICAL CONTAINER FOR DISTRIBUTION OF CHEMICAL AGENT

BACKGROUND OF THE INVENTION

1. Field of the Invention

The present invention relates to a container for supplying a chemical agent into plants, porous elements such as wood, and so on. The container is particularly suitable for delivering a chemical agent to the phloem layer of a tree. The chemical agent may be either a herbicide or any other tree destroying agent if the treatment is designed to kill the tree, or a fertilizer, fungicide or other medicant or nutrient if the treatment is designed to cure the tree from a disease or a nutrient deficiency. The invention may also be miniaturized for other applications such as the delivery of dye in order to change the color of flowers and so on.

2. Description of Related Art

U.S. Pat. No. 5,485,698 discloses a tree treatment capsule including a plug insertable into an end opening of an internal cavity of a plastic container. An impact force is applied to a head element of the plastic container to move the head element towards the plug and break a shank of the container. A chemical agent is released from the internal cavity when the shank is broken in this way.

SUMMARY OF THE INVENTION

It is one object of this invention to provide a container which permits distribution of a chemical agent without requiring manual destruction of any part of the container for the chemical agent.

It is another object of the invention to provide a container for a chemical agent having a construction which is alternative to previously known capsule constructions.

These and other objects are achieved by the provision of a prismatic, pyramidal or similar container for insertion into a notch in an element. A chemical agent is released from a container volume into the element. The prismatic version of the container includes a plurality of first sides inclined outwardly relative to each other from at least one junction. These first sides form lateral sides of the container. A pair of second sides, parallel to each other, form longitudinal ends of the container. At least one of the first sides and the second sides forms at least a part of a cap. The cap closes off an opening which provides access to the container volume for storage of the chemical agent. The second sides are formed of a biodegradable material which dissolves for release of the chemical agent.

A dividing wall, or dividing walls, may be incorporated in the container volume to define and separate plural chambers containing plural chemical agents.

According to one embodiment of the invention, one of the first sides forms the cap. According to another embodiment, however, the cap includes an end wall forming one of the second sides. In this case, the container includes an additional cap for closing off an additional opening which provides access to the container volume.

In certain constructions, at least one of the second sides is provided with an area of reduced thickness to hasten delivery of the chemical agent to the element. Protrusions may be provided on at least two of the first sides for retaining the container within the notch. The material from which the second sides are formed may be either polyvinyl alcohol or corn starch. A snap-fit connection may be used to connect the or each cap to the rest of the container.

The container may alternatively include a single conical lateral side of biodegradable material inclined outwardly from a vertex.

DESCRIPTION OF THE PREFERRED EMBODIMENTS

Figure 1:
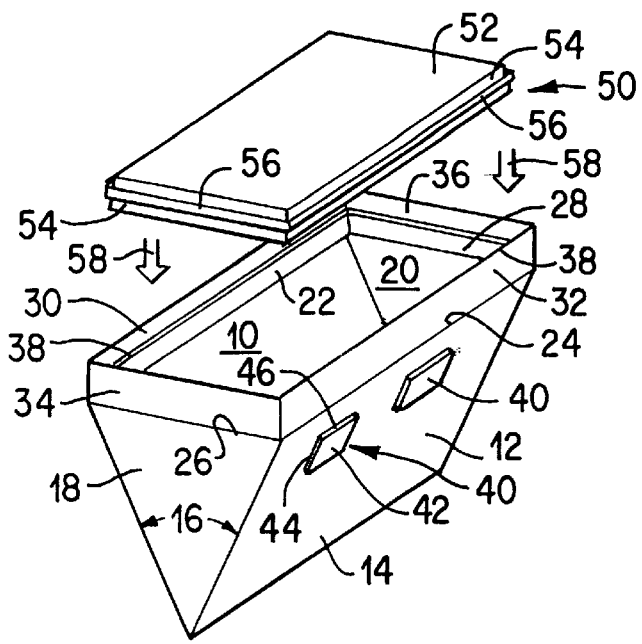
FIG. 1 is a perspective view of a prismatic container for a chemical agent in accordance with a first embodiment of the invention.

The first prismatic container embodiment shown in FIG. 1 includes a pair of first lateral container sides 10 and 12. The first sides 10 and 12 are inclined outwardly at an acute angle 16 relative to each other from a junction formed by an intersection line or apex 14. The sides 10 and 12 may be inclined at any desired acute angle; as illustrated, the angle 16 is approximately 45°.

A pair of second sides 18 and 20 form the longitudinal ends of the prismatic container. The second sides 18 and 20, as illustrated, are approximately parallel to each other and have triangular inner and outer faces.

Upper edges 22, 24, 26 and 28 are defined by the sides 10, 12, 18 and 20, respectively. Parallel upstanding flanges 30 and 32 are defined on the upper edges 22 and 24 of the inclined sides 10 and 12. Parallel upstanding flanges 34 and 36 are defined on the upper edges 26 and 28 of the parallel sides 18 and 20. The flanges 30, 32, 34 and 36 together form an approximately rectangular container opening. An inwardly opening groove 38 is formed in the inner surface of each of the upstanding flanges 30, 32, 34 and 36.

One or more protrusions 40 may be provided on each of the outwardly facing surfaces of the inclined first sides 10 and 12. FIG. 1 shows the provision of two such protrusions 40. Each protrusion 40 is inclined outwardly relative to the wall on which it is mounted so as to define an inclined surface 42, triangular side surfaces 44 and a rectangular abutment surface 46. The protrusions 40 are provided to help frictionally retain the container within a notch or kerf within which the container is mounted when in use and are integral with the inclined sides 10 and 12 of the container.

The sides 10, 12, 18 and 20 and the flanges 30, 32, 34 and 36 are all formed into an integral unit according to the preferred embodiment.

A cap 50 is used to tightly close off the rectangular container opening formed by the flanges 30, 32, 34 and 36. The cap 50 includes approximately rectangular inner and outer surfaces 52 (only the outer surface 52 is indicated in FIG. 1) and lateral surfaces 54. An outwardly extending flange 56 is defined on the lateral surfaces 54 so that the flange 56 extends completely around the cap perimeter formed by the lateral surfaces 54. The flange 56 snaps into the groove 38 so as to provide a snap-fit connection between the cap 50 and the upstanding flanges 30, 32, 34 and 36 when the cap is moved in the direction of arrows 58. The positions of the flange 56 and the groove 38 could be reversed if desired; the flange 56, in other words, could be located on the upstanding flanges 30, 32, 34 and 36 and the groove 38 could be located in the lateral surfaces 54.

At least the second sides 18 and 20 of the container are made of a biodegradable material such as polyvinyl alcohol or corn starch to facilitate dissolution of these sides upon contact with the sap of a tree, the fluid in cut flower stems, or similar liquids. The first sides 10 and 12 and the cap 50 could also be made of such a biodegradable material. Alternatively, the sides 10 and 12, the cap 50, or both the sides 10 and 12 and the cap 50 could be made of other types of biodegradable or nonbiodegradable plastic or of steel and so on for higher strength.

When assembling the container, a chemical agent is introduced into the volume defined by inner surfaces of the sides 10, 12, 18 and 20. The chemical agent may be any appropriate type of herbicide or fungicide, a fertilizer, a preservative, some sort of dye, pigment, or pigment suspension, or any other type of chemical agent desired. The chemical agent, moreover, may be in the form of a tablet, a powder, a jelly-like material, a pasty material, or a liquid. After the volume has been filled with the chemical agent, the cap 50 is inserted into the container opening formed by the flanges 30, 32, 34 and 36 and forced by pressure applied in the direction of the arrows 58 until the flange 56 snaps into the groove 38 to close the container opening. A close fit between the groove 38 and the flange 56 seals off the prismatic container volume so that leakage of the chemical agent from the volume is kept to a minimum. It is possible to additionally apply an adhesive at the junction between the cap 50 and the flanges 30, 32, 34 and 36 to further secure the cap in place and provide a seal which reduces leakage even further. The assembled prismatic container is now ready for use.

Figure 2:
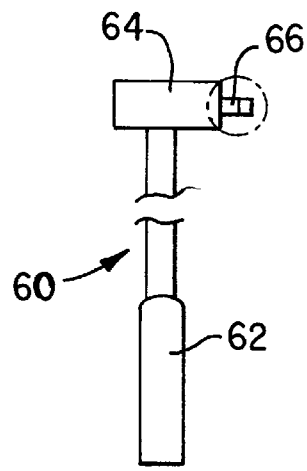
FIG. 2 is an illustration of a tool which can be used to create a notch in a tree or other wooden element into which the container of FIG. 1 is inserted.
Figure 3:
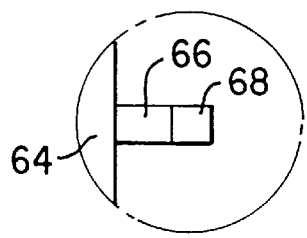
FIG. 3 is an enlarged view of the circled portion of FIG. 2 and showing a notching element of the tool.
Figure 4:
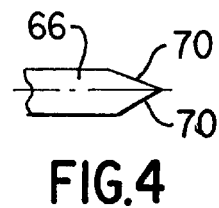
FIG. 4 is a top view of the notching element shown in FIG. 3.

A tool 60 which may be used to create the notch or kerf into which the prismatic container can be inserted is shown in FIG. 2. Clearly, the tool 60 is only appropriate for use in trees, wooden posts or other elements having substantial sizes. When the prismatic container is miniaturized for use with cut flowers, smaller trees and so on, the notch must be made in some other way such as with a knife.

Figure 5:
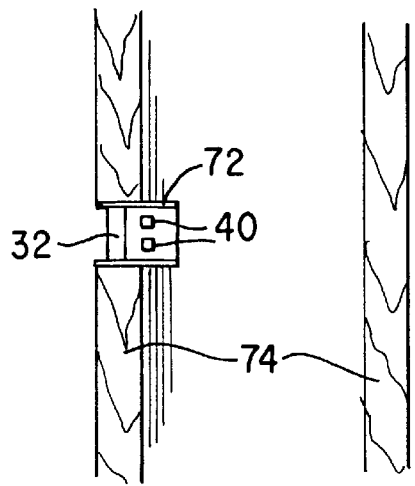
FIG. 5 is an illustration of the manner in which the container of FIG. 1 is used to dispense the chemical agent into a tree.

The tool 60 includes a handle 62 and a head 64. A notching element 66 extends from one end of the head 64 and includes a pointed edge 68 formed by inclined sides 70. The inclined sides 70 correspond in inclination and dimensions to those of the first sides 10 and 12. The handle 62 is grasped by a user and the tool is swung towards a tree or other element in order to form a notch 72. The prismatic container is then inserted into the notch and frictionally retained in the position shown in FIG. 5 by the protrusions 40.

If the notch 72 is formed in a tree, then it should be formed through the bark 74 and to a depth which is sufficient to cause at least parts of the second sides 18 and 20 to align with the phloem layer of the tree. This will help the chemical agent to be quickly and effectively released into the tree. The inclined surfaces 10 and 12 of the container cooperate with the sides of the notch 72 formed by the sides 70 of the notching element 66 to at least partly close off the notch and prevent excessive leakage of sap.

Figure 6:
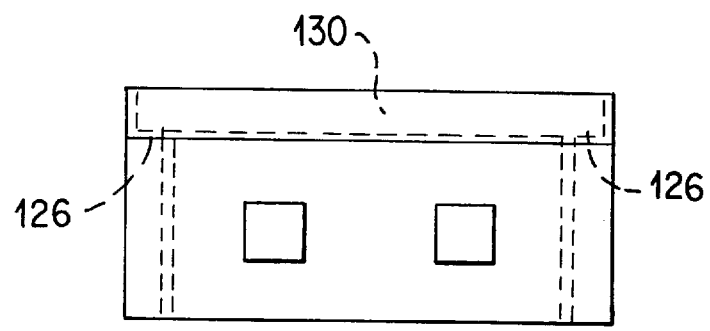
FIG. 6 is a side view of a second embodiment of the invention.
Figure 7:
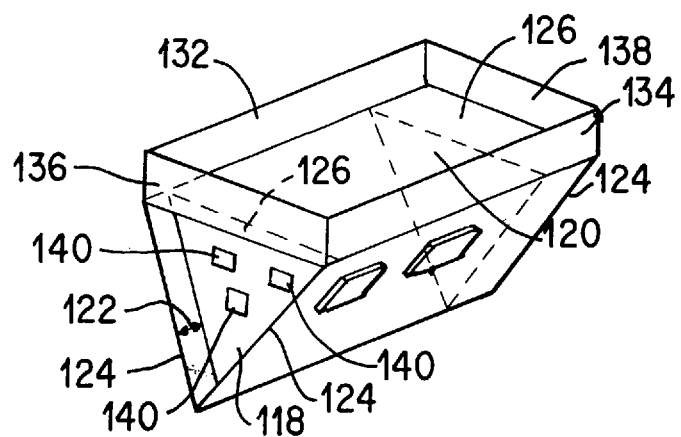
FIG. 7 is a perspective view similar to FIG. 1 but showing the second embodiment.

The second prismatic container embodiment is shown in FIGS. 6 and 7. Many elements of the second embodiment are the same as corresponding elements of the first embodiment and a repetitive description of these elements is not provided. The second container embodiment is intended for use in the same way as the first container embodiment.

The second embodiment of the prismatic container includes a pair of first lateral container sides and a pair of second sides 118 and 120 forming longitudinal ends of the prismatic container. The pair of second sides 118 and 120 differs from the pair of second sides 18 and 20 in the first embodiment. The sides 118 and 120 are set back or recessed by a spacing 122 from ends 124 of the first pair of sides. An overhang or shelf 126 extends outwardly and away from each of the upper edges of the sides 118 and 120.

A cap 130 is used to close the second prismatic container embodiment and rests on the shelves 126 when the container is closed. The second prismatic container embodiment, as illustrated, does not include a flange and groove connection between the cap 130 and the upstanding flanges 132, 134, 136 and 138; such a flange and groove connection could be provided if desired. An adhesive, for example, could be used to secure the cap in the position illustrated in FIG. 6 in the absence of a flange and groove connection.

Each of the second sides 118 and 120 includes areas 140 of reduced thickness. In other words, membranes forming the sides 118 and 120 are thinner in the areas 140 than in other areas. The areas 140 of reduced thickness dissolve more quickly than other areas of the sides 118 and 120 to hasten delivery of the chemical agent in the container. Because only the areas 140 are of reduced thickness, however, the strength and integrity of the sides 118 and 120 are not significantly reduced.

The third prismatic container embodiment is shown in FIGS. 8–11. A central body section 210 of this embodiment has three lateral walls or sides 212 which are joined together at junctions formed by intersection lines or apices 214. The three sides together form a hollow element having a triangular cross section. Caps 216 are used to tightly close opposite ends of the central body section 210.

Each end section of the central body includes an opening 218 corresponding in shape to one of the caps 216. Abutment shoulders 220 are defined at innermost ends of the central body end sections. Each end section includes an inwardly opening circumferential groove 222 formed in its inner surfaces. Each of these grooves 222 is designed to cooperate with one of the flanges 224 defined on the side walls 226 of the caps 216.

Figure 9:
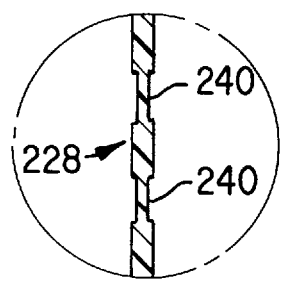
FIG. 9 is an enlarged sectional view of the circled portion of FIG. 8.
Figure 10:
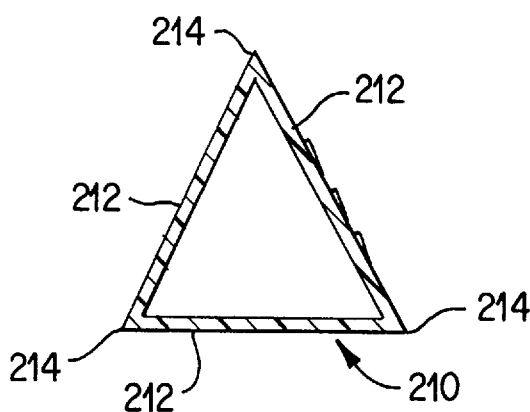
FIG. 10 is a sectional view along line 10—10 of FIG. 8.
Figure 11:
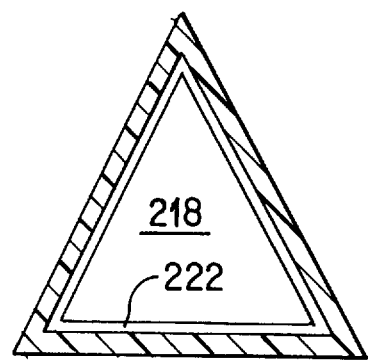
FIG. 11 is a sectional view along line 11—11 of FIG. 8.

The side walls 226 of each cap 216 extend from the perimeter of an end wall 228 of the cap. As FIG. 9 illustrates, the end wall 228 can be formed with reduced thickness areas 240 which are similar to the areas 140 of the second embodiment.

At least the end walls 228 of the caps 216 are made of a biodegradable material such as those mentioned earlier. Each end wall 228, therefore, forms a second side similar to the second sides 18 and 20 of the first embodiment. The remaining elements of the third embodiment could also be made of this biodegradable material or of the other types of material also mentioned earlier.

Figure 8:
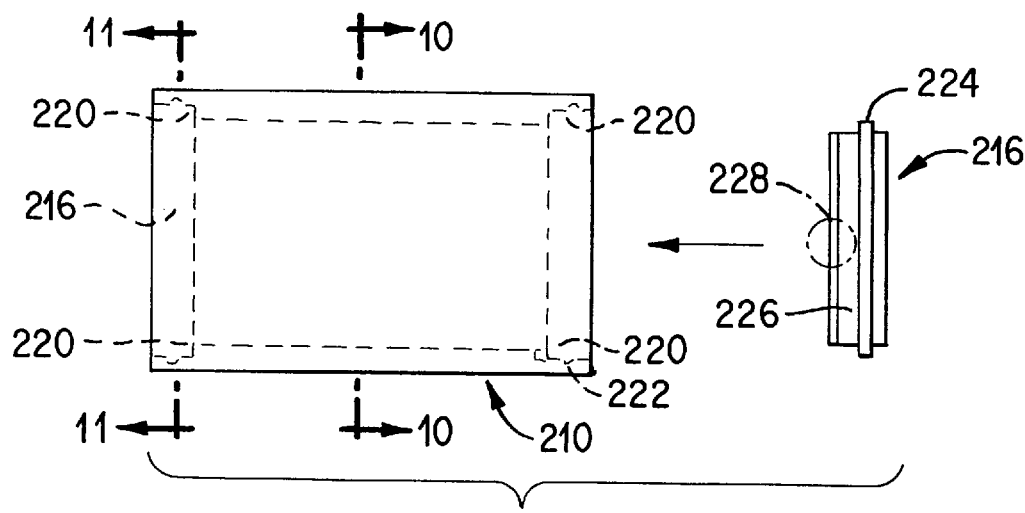
FIG. 8 is a side view of a third embodiment of the invention.

When assembling the third prismatic container embodiment, one of the caps 216 is moved in a direction indicated by the arrow in FIG. 8 so that the end wall 228 of the cap abuts a shoulder 220 and the flange 224 of the cap snaps into a groove 222. A chemical agent is then introduced into the volume defined by the inner surface of the cap end wall 228 and the inner surfaces of the sides 212. Once a sufficient amount of the chemical agent has been filled into this volume, the other cap 216 is moved in the direction indicated by the arrow in FIG. 8 and snapped into place. The container is then ready for use in the same way as described in connection with the first container embodiment.

Figure 12:
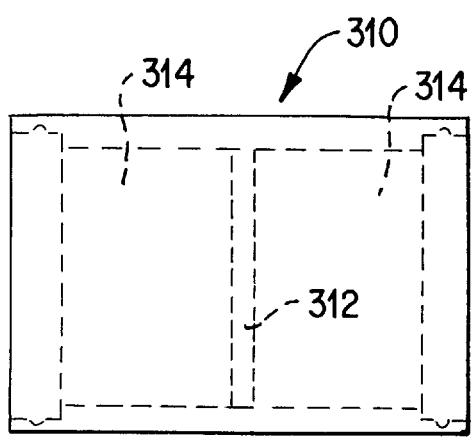
FIG. 12 is an illustration of a variation of the third embodiment of the invention.

A variation of the embodiment shown in FIGS. 8–11 is illustrated in FIG. 12. A central body section 310 of this variation is identical in all respects to the central body section 210 described previously except that the central body section 310 includes at least one dividing wall 312 within its volume. Each dividing wall 312 separates chambers 314 defined within the body section 310 from each other. One chemical, such as an insecticide, may be stored in one of the chambers 314, while another chemical, such as a fungicide, may be stored in another of the chambers 314. Additional chambers 314 may be formed by including additional dividing walls 312. The dividing wall or walls can be formed of the same material as the central body section 210 described previously.

Figure 13:
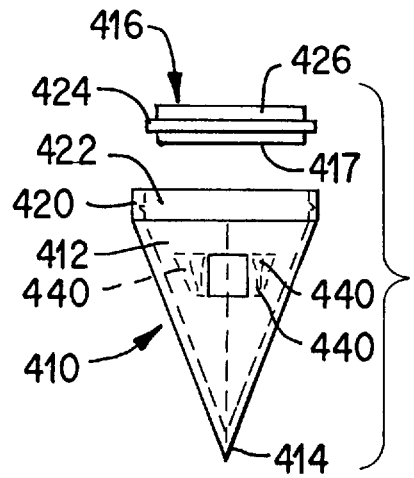
FIG. 13 is a side view of a fourth embodiment of the invention.
Figure 14:
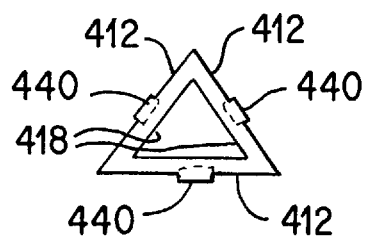
FIG. 14 is a top view of the body section of the fourth embodiment.

A pyramidal container embodiment is shown in FIGS. 13 and 14. A body section 410 of this embodiment includes triangular sides 412 with a common vertex 414. A cap 416 closes off an internal volume 418 defined by inner surfaces of the sides 412 and an inner surface 417 of the cap 416. A groove 420 is formed in upstanding flanges 422 defined on upper edges of the sides 412. An outwardly extending flange 424 is defined on the lateral surfaces 426 of the cap 416. The flange 424 cooperates with the groove 420, in the same way as the flange 56 cooperates with the groove 38 of the first prismatic container embodiment, to seal off the internal volume 418.

Each of the sides 412 may be provided with a protrusion 440 having the same construction and purpose as any of the protrusions 40 of the first prismatic container embodiment.

Figure 15:
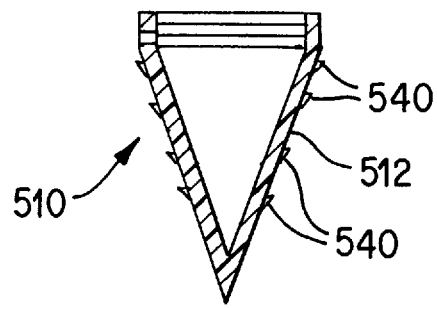
FIG. 15 is a side sectional view of a fifth embodiment of the invention having a single conical side wall.

Although the pyramidal container shown in FIGS. 13 and 14 includes a three-sided body section 410, containers having body sections with additional sides or faces could also be used. Alternatively, the container could include a conical body section 510 as shown in FIG. 15. FIG. 15 also shows plural circumferential protrusions 540 formed on the conical outer surface 512 of the body section 510 and having the same function as that of the protrusions 40 or 440.

The sides 412 of the pyramidal container and the conical side of the body section 510 can be made of the same materials as those mentioned previously. Biodegradable materials such as polyvinyl alcohol or corn starch are particularly appropriate. The cap 416 of the pyramidal container and the cap (not shown) of the conical container can also be made of such biodegradable materials or may be made of metal or other non-biodegradable materials if desired. Other materials which may be used for any of the container embodiments described include potato starch, starch from other types of vegetation, and wood.

Variations in the embodiments described above and represented in the drawing figures may occur to those skilled in the art. It is intended to protect any such variations which do not depart from the spirit of this invention by the following claims.

I claim:

1. A prismatic container for insertion into a notch in an element in order to release a chemical agent from a container volume into the element comprising:
   a plurality of first sides inclined outwardly relative to each other from at least one junction and forming lateral sides of the container; and
   a pair of second sides parallel to each other and forming longitudinal ends of the container;
   at least one of said first and second sides forming at least part of a cap for closing off an opening which provides access to the container volume for storage of the chemical agent;
   said second sides being formed of a biodegradable material which dissolves for release of the chemical agent.

2. A container as defined by claim 1, wherein one of said first sides forms said cap.

3. A container as defined by claim 1, wherein said cap includes an end wall forming one of said second sides.

4. A container as defined by claim 1, and further comprising an additional cap for closing off an additional opening which provides access to the container volume.

5. A container as defined by claim 4, wherein said cap and said additional cap include end walls forming said second sides.

6. A container as defined by claim 1, wherein at least one of said second sides is provided with an area of reduced thickness to hasten delivery of the chemical agent to the element.

7. A container as defined by claim 1, and further comprising protrusions on at least two of said first sides for retaining the container within the notch.

8. A container as defined by claim 1, wherein said material is polyvinyl alcohol.

9. A container as defined by claim 1, wherein said material is corn starch.

10. A container as defined by claim 2, wherein at least one of said second sides is provided with an area of reduced thickness to hasten delivery of the chemical agent to the element.

11. A container as defined by claim 2, and further comprising protrusions on at least two of said first sides for retaining the container within the notch.

12. A container as defined by claim 6, and further comprising protrusions on at least two of said first sides for retaining the container within the notch.

13. A prismatic container for insertion into a notch in an element in order to release a chemical agent into the element comprising:
   lateral walls forming a hollow element having a triangular cross section; and
   end walls disposed in opposite end sections of said hollow element and closing off openings which provide access to an interior of the container for storage of the chemical agent;
   said end walls being formed of a biodegradable material which dissolves for release of the chemical agent.

14. A container as defined by claim 13, and further comprising a dividing wall within said interior for separating chambers of said container.

15. A prismatic container for insertion into a notch in an element in order to release a chemical agent from a container volume into the element comprising:

a pair of first sides inclined outwardly relative to each other from a junction and forming lateral sides of the container volume;

a pair of second sides parallel to each other and forming longitudinal ends of the container volume; and a cap for closing off an opening which provides access to the container volume for storage of the chemical agent;

said second sides being formed of a biodegradable material which dissolves for release of the chemical agent.

16. A container as defined by claim 15, wherein at least one of said second sides is provided with an area of reduced thickness to hasten delivery of the chemical agent to the element.

17. A container as defined by claim 15, and further comprising protrusions on said first sides for retaining the container within the notch.

18. A container as defined by claim 16, and further comprising protrusions on said first sides for retaining the container within the notch.

19. A container as defined by claim 15, wherein said material is polyvinyl alcohol.

20. A container as defined by claim 15, wherein said material is corn starch.

21. A container as defined by claim 15, and further comprising a snap fit connection between said cap and said sides.

22. A container for insertion into a notch in an element in order to release a chemical agent from a container volume into the element comprising:

a plurality of walls defining and enclosing the container volume, at least one pair of said walls diverging outwardly from an intersection line forming a junction at which said walls meet; and a cap for closing off an opening which provides access to the container volume for storage of the chemical agent;

said walls being formed of a biodegradable material which dissolves for release of the chemical agent.

* * * * *